US012606257B2

(12) United States Patent
Bair

(10) Patent No.: US 12,606,257 B2
(45) Date of Patent: Apr. 21, 2026

(54) GREASABLE HUB FOR A CONTINUOUS TRACK SYSTEM

(71) Applicant: Bair Products, Inc., Louisburg, KS (US)

(72) Inventor: Larry Bair, Louisburg, KS (US)

(73) Assignee: Bair Products, Inc., Louisburg, KS (US)

( * ) Notice: Subject to any disclaimer, the term of this patent is extended or adjusted under 35 U.S.C. 154(b) by 660 days.

(21) Appl. No.: 17/713,523

(22) Filed: Apr. 5, 2022

(65) Prior Publication Data

US 2023/0312030 A1     Oct. 5, 2023

(51) Int. Cl.
    *B62D 55/092* (2006.01)
    *B62D 55/088* (2006.01)
    *B62D 55/32* (2006.01)
(52) U.S. Cl.
    CPC ....... *B62D 55/092* (2013.01); *B62D 55/0887* (2013.01); *B62D 55/32* (2013.01)
(58) Field of Classification Search
    CPC .. B62D 55/0887; B62D 55/092; B62D 55/14; B62D 55/32; B60B 2320/10
    See application file for complete search history.

(56) References Cited

U.S. PATENT DOCUMENTS

| | | | | |
|---|---|---|---|---|
| 165,097 A | * | 6/1875 | Hendry ................... | B60B 27/00 |
| | | | | 301/105.1 |
| 393,328 A | * | 11/1888 | Puyot ..................... | B60B 27/00 |
| | | | | 301/105.1 |
| 2,506,278 A | * | 5/1950 | Ristow ................. | B60B 27/001 |
| | | | | 301/105.1 |
| 2,906,558 A | * | 9/1959 | Forbush .............. | B60B 27/0005 |
| | | | | 301/105.1 |
| 3,330,563 A | * | 7/1967 | Frank ...................... | F16J 15/46 |
| | | | | 384/489 |
| 3,785,706 A | * | 1/1974 | Vangalis ................. | B60B 7/002 |
| | | | | 184/45.1 |
| 3,810,679 A | * | 5/1974 | Myers ..................... | B60B 27/02 |
| | | | | 40/587 |
| 4,636,007 A | * | 1/1987 | Persons .................. | B60B 27/02 |
| | | | | 301/105.1 |
| 6,371,578 B1 | * | 4/2002 | Ferguson ........... | B62D 55/0887 |
| | | | | 305/107 |

(Continued)

FOREIGN PATENT DOCUMENTS

| | | | | | |
|---|---|---|---|---|---|
| JP | | 2000142009 A | * | 5/2000 | ............ F16C 35/073 |

*Primary Examiner* — S. Joseph Morano
*Assistant Examiner* — Eva L Comino
(74) *Attorney, Agent, or Firm* — Erise IP, P.A.

(57) ABSTRACT

A greasable axle and hub kit assembly and method of installing the greasable axle and hub kit assembly in the frame of a continuous tread machine is provided. The greasable axle and hub kit assembly utilizes at least an inner seal, greased bearing, an anti-spin washer, a fastener, an outer dust cap, an inner seal protector, and an outer seal protection cap to provide for an axle and hub kit assembly with an improved lifetime and a reduced chance of blow-outs. The greasable axle and hub kit may further comprise a coupled grease zerk for applying grease to the interior of the hub portion, providing lubrication to the interior components. The greasable axle and hub kit may even further comprise a pilot flange for attaching wheels of varying sizes and materials to the greasable axle and hub kit.

20 Claims, 7 Drawing Sheets

(56)         References Cited

U.S. PATENT DOCUMENTS

| | | | |
|---|---|---|---|
| 6,497,460 B2 * | 12/2002 | Lemke | B62D 55/10 |
| | | | 384/138 |
| 7,066,690 B2 * | 6/2006 | Ebert | B23P 6/00 |
| | | | 408/102 |
| 9,656,795 B2 * | 5/2017 | Guschke | B65D 77/003 |
| 9,688,098 B2 * | 6/2017 | Feicha | B60B 7/14 |
| 9,975,591 B2 * | 5/2018 | Bair | B62D 55/32 |
| 2003/0062765 A1 * | 4/2003 | Melton | B60B 35/18 |
| | | | 301/137 |
| 2014/0259673 A1 * | 9/2014 | Ebert | B60B 27/0078 |
| | | | 29/898.07 |
| 2020/0238758 A1 * | 7/2020 | Dombroski | B60B 35/14 |
| 2020/0316690 A1 * | 10/2020 | Ebert | B23B 41/00 |

* cited by examiner

GREASABLE HUB FOR A CONTINUOUS TRACK SYSTEM

BACKGROUND

1. Field

Embodiments of the present invention relate to hub and axle kits for machines that use continuous tracks, such as vehicles that use continuous tracks for propulsion. More particularly, embodiments of the present invention relate to a greasable axle and hub system with safeguards in place to prevent blowouts and for limiting or preventing debris from entering the axle and hub system.

2. Related Art

Continuous track systems are commonly used for agricultural, manufacturing, recreation, and military uses. Some common examples of machines utilizing continuous track systems include snowmobiles, tractors, bulldozers, excavators, and tanks. Such machines run on a continuous band of treads or track plates driven by two or more wheels. The two or more wheels may be supported by an axle and hub connected or attached to the frame of the machine. Typically, a continuous track system comprises multiple sets of wheels with an axle and hub connected to each set of wheels.

Each individual axle and hub portion, while a relatively small component of the overall continuous track system, is nevertheless vital to the integrity of the entire continuous track system. If even one axle and hub portion is compromised, the continuous track may come loose, break, or otherwise render the machine inoperable. Typically, axles may become compromised through excessive use and the breakdown of bearings or other components located within the hub of the axles due to friction between the parts. The lifetime of the axles may also be reduced through the introduction of dust, debris, or other materials entering the interior of the hub. The introduction of such debris can increase the degradation of the interior components or otherwise negatively impact how the interior parts perform. Additionally, during use, there is a chance that the interior forces can cause a blow-out of the axle, leading to one or more parts or components being ejected from inside the hub of the axle.

Accordingly, what is needed is a hub and axle system with an improved lifetime over existing systems through the reduction of friction between the parts of the hub and axle. Additionally, what is needed is a hub and axle system with safeguards in place to prevent or limit the chance or frequency of blowouts of the hub and axle system. Even further, what is needed is a method of replacing factory or existing hub and axle systems with an improved hub and axle system.

SUMMARY

In some aspects, the techniques described herein relate to an axle and hub device for a continuous track machine, the axle and hub device includes: an axle having a first end and a second end, wherein each of the first end and the second end is threaded, wherein the axle is configured for placement in a frame of the continuous track machine; a first hub configured for placement on the first end of the axle; and a second hub configured for placement on the second end of the axle, wherein each of the first hub and the second hub includes: an inner seal; at least one greased bearing; an anti-spin washer; a fastener; an outer dust cap, an inner seal protector, and an outer seal protection cap, wherein each of the first hub and the second hub further include a grease zerk.

In some aspects, the techniques described herein relate to an axle and hub device, wherein each of the first end and the second end of the axle further includes at least one recessed groove.

In some aspects, the techniques described herein relate to an axle and hub device, wherein the anti-spin washer further includes at least one bit extending towards the center of the anti-spin washer.

In some aspects, the techniques described herein relate to an axle and hub device, wherein each anti-spin washer is installed by aligning the at least one bit with one of the recessed grooves and sliding the anti-spin washer along the recessed groove until reaching the bearing.

In some aspects, the techniques described herein relate to an axle and hub device, wherein a second anti-spin washer is installed by aligning the at least one bit with the recessed groove located on the second end of the axle and sliding the anti-spin washer along the recessed groove until reaching the bearing.

In some aspects, the techniques described herein relate to an axle and hub device, wherein the anti-spin washer is configured for maintaining position during rotation of the axle.

In some aspects, the techniques described herein relate to an axle and hub device, wherein the outer seal protection cap includes a lip that wraps around a portion of the hub.

In some aspects, the techniques described herein relate to a continuous track system for a machine, the system including: a machine including a continuous track and a frame; an axle having a first end and a second end, wherein the axle is configured for placement in the frame of the machine; a first hub configured for placement on the first end of the axle; and a second hub configured for placement on the second end of the axle, wherein each of the first hub and the second hub include: an inner seal, at least one greased bearing, an anti-spin washer, a fastener, an outer dust cap, an inner seal protector, and an outer seal protection cap; a first wheel, wherein the first wheel is attached to the first hub; and a second wheel, wherein the second wheel is attached to the second hub, wherein each of the first wheel and the second wheel engage the continuous track of the machine.

In some aspects, the techniques described herein relate to a system, wherein each of the first hub and the second hub further include an inner seal retainer ring, wherein the inner seal retainer ring is configured for maintaining a position of the inner seal.

In some aspects, the techniques described herein relate to a system, wherein each of the first hub and the second hub further include an outer dust cap retainer ring, wherein the outer dust cap retainer ring is configured for maintaining a position of the outer dust cap.

In some aspects, the techniques described herein relate to a system, wherein each of the first hub and the second hub further include a grease zerk.

In some aspects, the techniques described herein relate to a system, wherein the fastener of the first hub and the fastener of the second hub is a castle nut.

In some aspects, the techniques described herein relate to a system, wherein each of the first hub and the second hub further include a cotter pin, wherein the cotter pin engages with the castle nut for maintaining a position of the castle nut.

In some aspects, the techniques described herein relate to a system, wherein each of the first hub and the second hub further include a flange, wherein the flange is located between the hub and the wheel.

In some aspects, the techniques described herein relate to a method of installing and axle and hub to a continuous track machine, the method including: inserting an axle including a first end and a second end into the frame of a machine, wherein the machine includes a continuous track; inserting a first bearing, a second bearing, an inner seal, and an inner seal protector into the interior of a first hub, wherein the first hub includes a proximal, a distal end and an axle channel, securing an outer seal protector to the proximal end of the first hub; placing the first hub proximal end first onto the first end of the axle, wherein the axle passes through the axle channel, inserting, a top washer and a fastener into the interior of the first hub, wherein the fastener is secured to the first end of the axle; placing an outer dust cap inside the first hub; and repeating.

In some aspects, the techniques described herein relate to a method, further including applying grease to the first bearing and the second bearing prior to insertion into the hub.

In some aspects, the techniques described herein relate to a method, further including applying grease to the inner seal prior to insertion into the hub.

In some aspects, the techniques described herein relate to a method, further including applying grease to the interior of the first hub via a first grease zerk, wherein the first grease zerk is coupled to the first hub; and applying grease to the interior of the second hub via a second grease zerk, wherein the second grease zerk is coupled to the second hub.

In some aspects, the techniques described herein relate to a method further including, removing a pre-existing axle from the frame of the machine.

In some aspects, the techniques described herein relate to a method further including: leaving a portion of the pre-existing axle attached to the frame of the machine; placing a boring guide around the portion of the pre-existing axle attached to the frame; and boring an opening into the frame using the boring guide as a guide.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present invention will be apparent from the following detailed description of the embodiments and the accompanying drawing figures.

BRIEF DESCRIPTION OF THE DRAWING FIGURES

Embodiments of the present invention are described in detail below with reference to the attached drawing figures, wherein.

Figure 1A:
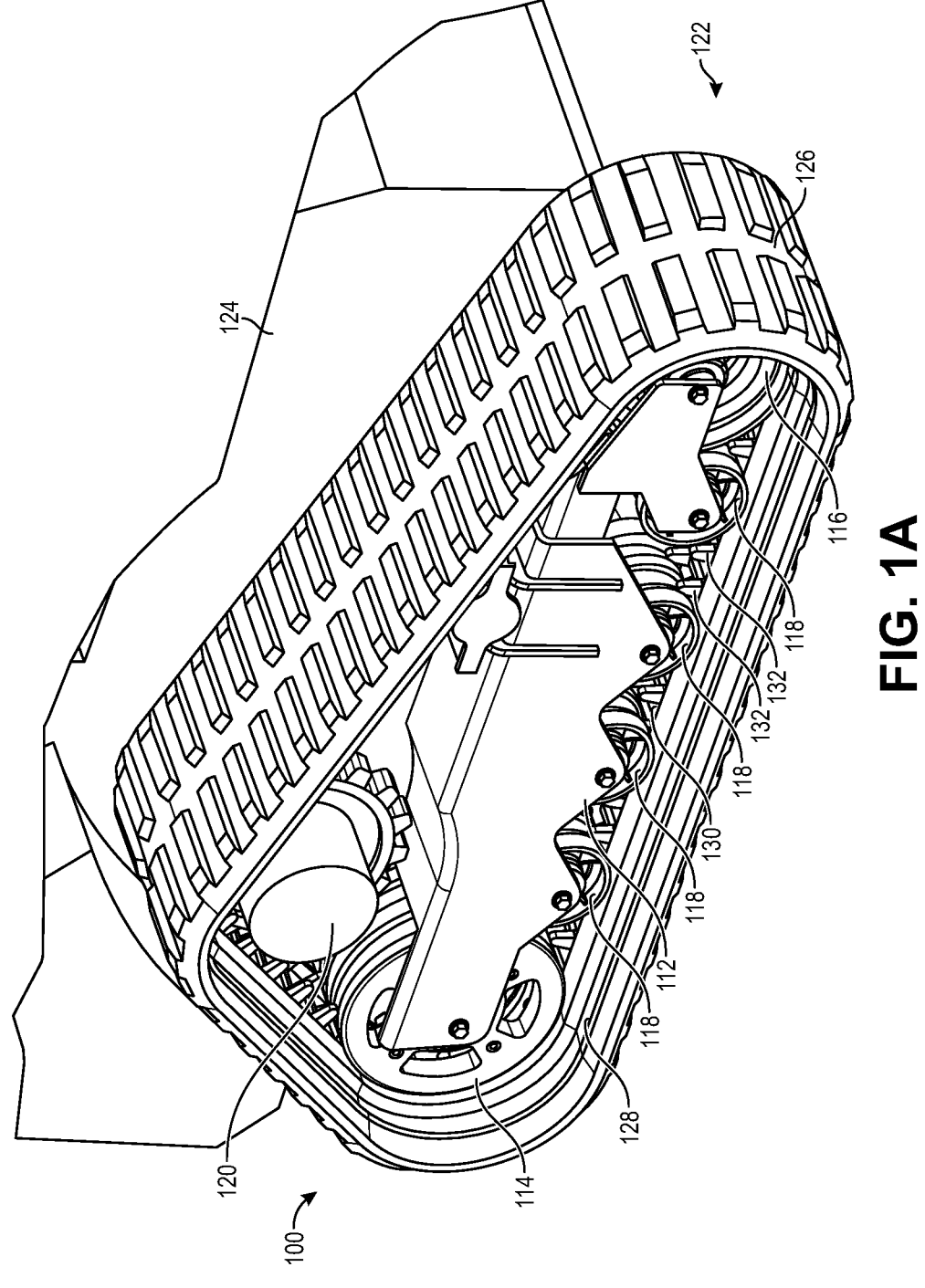
FIG. 1A is a side perspective view of a machine comprising a continuous track assembly in accordance with some embodiments.

The drawing figures do not limit the invention to the specific embodiments disclosed and described herein. The drawings are not necessarily to scale, emphasis instead being placed upon clearly illustrating the principles of the invention.

DETAILED DESCRIPTION

The following detailed description of embodiments of the invention references the accompanying drawings that illustrate specific embodiments in which the invention can be practiced. The embodiments are intended to describe aspects of the invention in sufficient detail to enable those skilled in the art to practice the invention. Other embodiments can be utilized, and changes can be made without departing from the scope of the present invention. The following detailed description is, therefore, not to be taken in a limiting sense. The scope of the invention is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments but is not necessarily included. Thus, the present technology can include a variety of combinations and/or integrations of the embodiments described herein.

Broadly, embodiments of the present invention are directed to an improved axle and hub system for continuous track machines. The present teachings disclose an axle and hub system that improves on the prior art by: (1) increasing the lifetime of the bearings; (2) prevents or limits the frequency of blowouts of the hub; and/or (3) limits or prevents the introduction of debris into the interior of the hub. As fully described below, the present teachings provide for an axle and hub system that utilizes various parts and components that achieve the above improvements either alone or in combination. Additionally, the present teachings provide an improved hub and axle system that may be used in a variety of continuous track machines. For example, in some embodiments, the present teachings may provide methods of installing an axle and hub system to the frame of a continuous track machine through welding. In further embodiments, the present teachings may provide methods of installing an axle and hub system to the frame of a continuous track machine using a floating system that does not require welding.

Figure 1B:
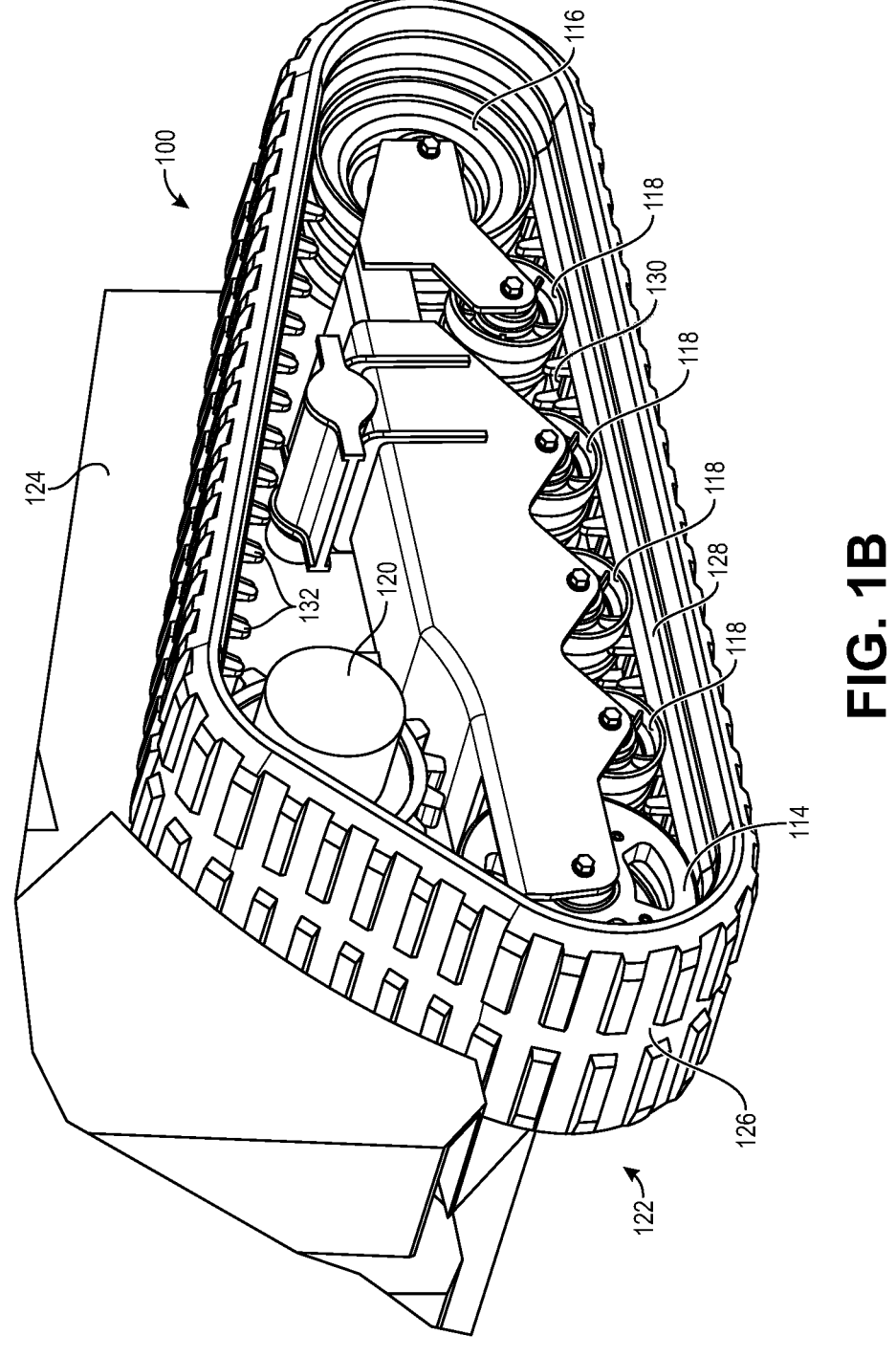
FIG. 1B is a rear perspective view of a machine comprising a continuous track assembly in accordance with some embodiments.

Referring now to FIGS. 1A and 1B, wherein like reference numerals designate identical or corresponding parts throughout the several views, an exemplary track assembly 100 is constructed in accordance with embodiments of the invention is illustrated. Generally, track assembly 100 depicts an exemplary continuous track machine that one or more parts or components of the present teachings may be combined or used with. It will be appreciated that the depicted embodiment of track assembly 100 is intended to be illustrative and is not intended to be a limiting feature of the present teachings. Accordingly, the present teachings may be used with any machine comprising a continuous track system.

The track assembly 100 broadly includes a frame 112, a plurality of wheels 114-120 supported by the frame 112, and a continuous track 122 circumscribing the wheels 114-120. The frame 112 generally supports at least some of the wheels 114-120 relative to the machine 124 on which the track assembly 100 is operated. If the machine 124 is a tracked vehicle, for example, the frame 112 supports at least some of the wheels 114-120 relative to the vehicle, wherein the vehicle rests, at least in part, on the frame 112. The wheels 114-120 may include rollers, sprockets, or other rotating elements, all of which are referred to as "wheels" herein for simplicity. If the machine 124 is a vehicle, for example, such wheels may include a drive wheel 120 or sprocket driven by a motor to induce rotational movement in the track, a plurality of bogie wheels 118 for supporting the vehicle on the track 122, and one or more idler wheels 114, 116. The idler wheels 114, 116 engage the track 122 and passively rotate to guide the track 122 along a desired path defined in part by a radially outer portion of each of the idler wheels 114, 116. One or more idler wheels 114, 116 may be placed on one end or both ends of the track assembly 100, while a series of bogie wheels 118 may be positioned in or near a center portion of the track assembly, as illustrated in FIGS. 1A and 1B. An idler wheel 114, 116 positioned on an end of the track assembly defines an end curve of a path followed by the track 122.

The continuous track 122 includes an outer side 126 engaging the ground and an inner side 128 engaging the plurality of wheels 114-120. The continuous track 122 (sometimes also referred to as an "endless" track) may be constructed of a series of linked elements, such as metal planks, may be constructed of a single, unitary piece of material such as rubber or other malleable material, or a combination thereof. The continuous track 122 includes an alignment mechanism 130 on the inner side 128 of the track 122 for engaging at least some of the wheels 114-120 and maintaining the track 122 in alignment with the wheels 114-120 during the operation of the machine 124. The track may further include a series of ribs or flanges following a longitudinal path along the inside of track 122 and configured to matingly engage a sprocket portion of the drive wheel 120. In the illustrated embodiment, the series of ribs are positioned inside a channel defined by the alignment mechanisms 130, as explained below.

The alignment mechanism 130 includes one or more inwardly extending elements 132 that define, or are aligned with, one or more longitudinal paths of the inner side 128 of the track 122. The inwardly extending elements 132 may be substantially continuous, such as a continuous flange or rail, or may be defined by a series of elements, such as a series of guide lugs or cleats arranged in a row along each of the one or more longitudinal paths. The alignment mechanisms 130 may define a longitudinal channel, such as where the alignment mechanism 130 includes two parallel rails or two parallel rows of guide lugs. In the illustrated embodiment, the alignment mechanism 130 includes two rows of guide lugs positioned on parallel longitudinal paths to define the longitudinal channel between the rows.

At least one of the wheels 114-120 is configured to engage the track 122 at multiple, transversely spaced points on the track 122. In particular, such a wheel or wheels is/are configured to engage both a first side and a second side of at least a portion of the alignment mechanism 130, thereby increasing the area of contact between the wheel and the alignment mechanism 130. In the illustrated embodiments, at least the rear idler wheel 114 is configured to engage the track at three points, including a first point inside the channel, a second point on a first side of the alignment mechanism 130 outside the channel, and a third point on a second side of the alignment mechanism 130 outside the channel and opposite the first side of the alignment mechanism. Thus configured, the wheel engaged both sides of the alignment mechanism 130 and, in the illustrated embodiment, both sides of each row of guide lugs.

Figure 2:
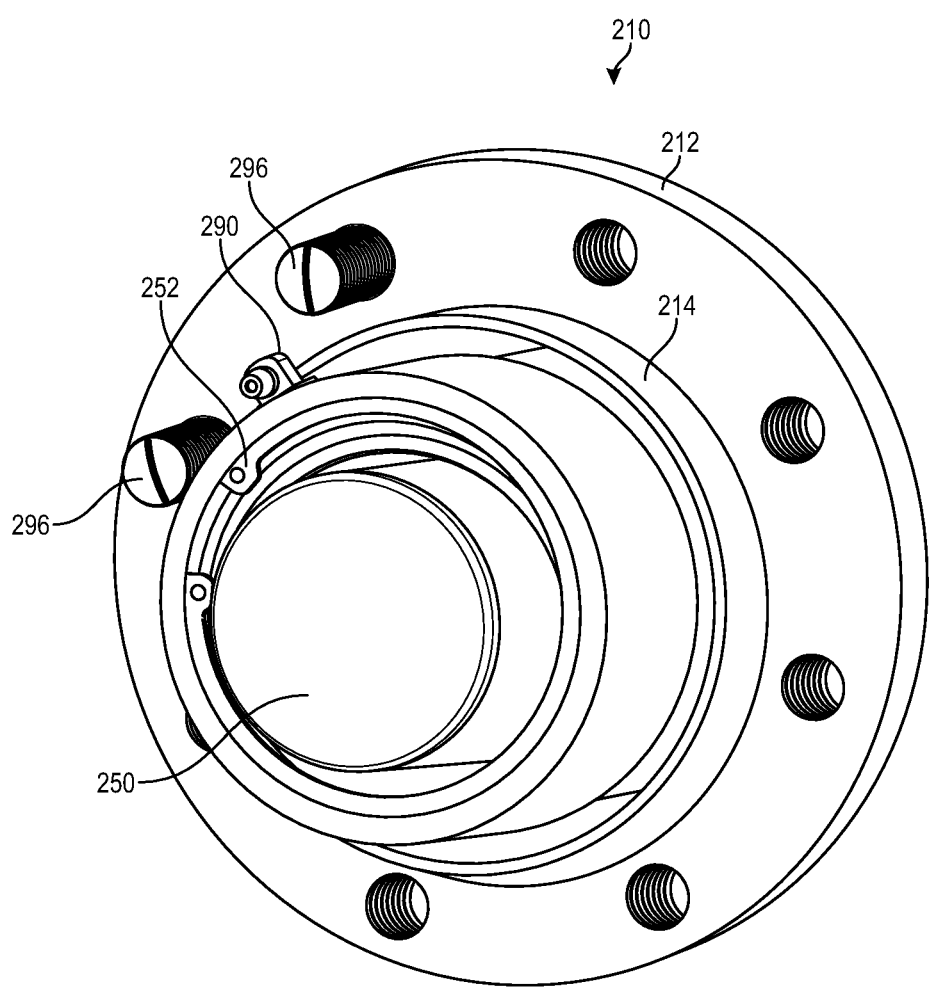
FIG. 2 is a side perspective view of an assembled hub in accordance with some embodiments.

FIG. 2 is a perspective view depicting an exemplary embodiment of a greasable axle and hub kit of the present teachings, generally referenced by reference numeral 200. In some embodiments, greasable hub and axle kit 200 may be used as an axle and hub component or portion for a machine 124 or other treaded vehicle. For example, in some embodiments, the greasable hub and axle kit 200 may be used as a replacement axle for a machine 124 and may be installed in the frame 112 of the machine 124 following removal of a pre-existing axle installed in the frame 112. In further embodiments, the greasable hub and axle kit 200 may be installed in the frame 112 of a newly manufactured machine 124. As described in greater detail below, one or more wheels may be attached to greasable hub and axle kit 200 for engaging track 122.

Figure 3:
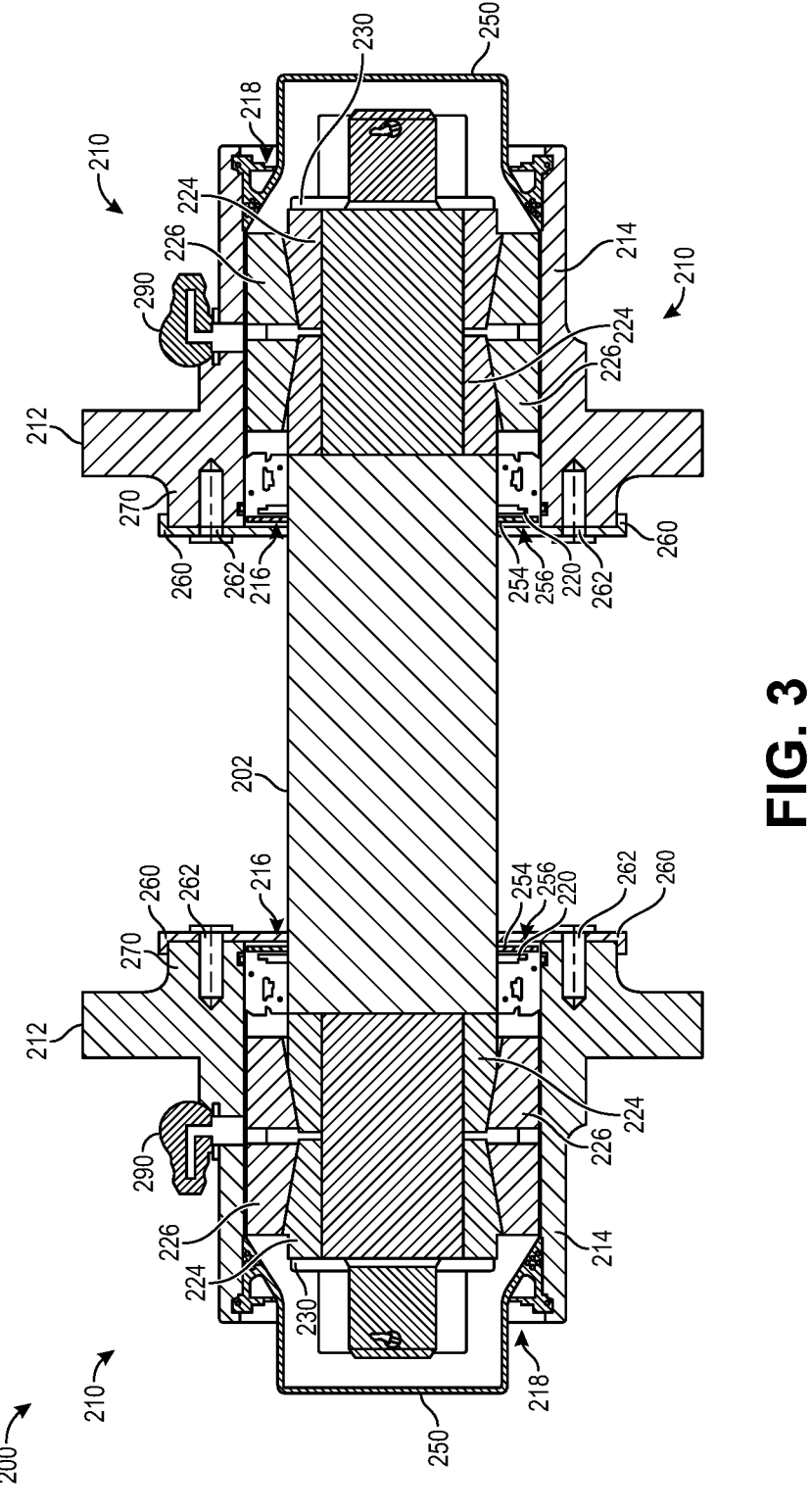
FIG. 3 is a cross-sectional view of an axle and hub kit in accordance with some embodiments.
Figures 4, 5:
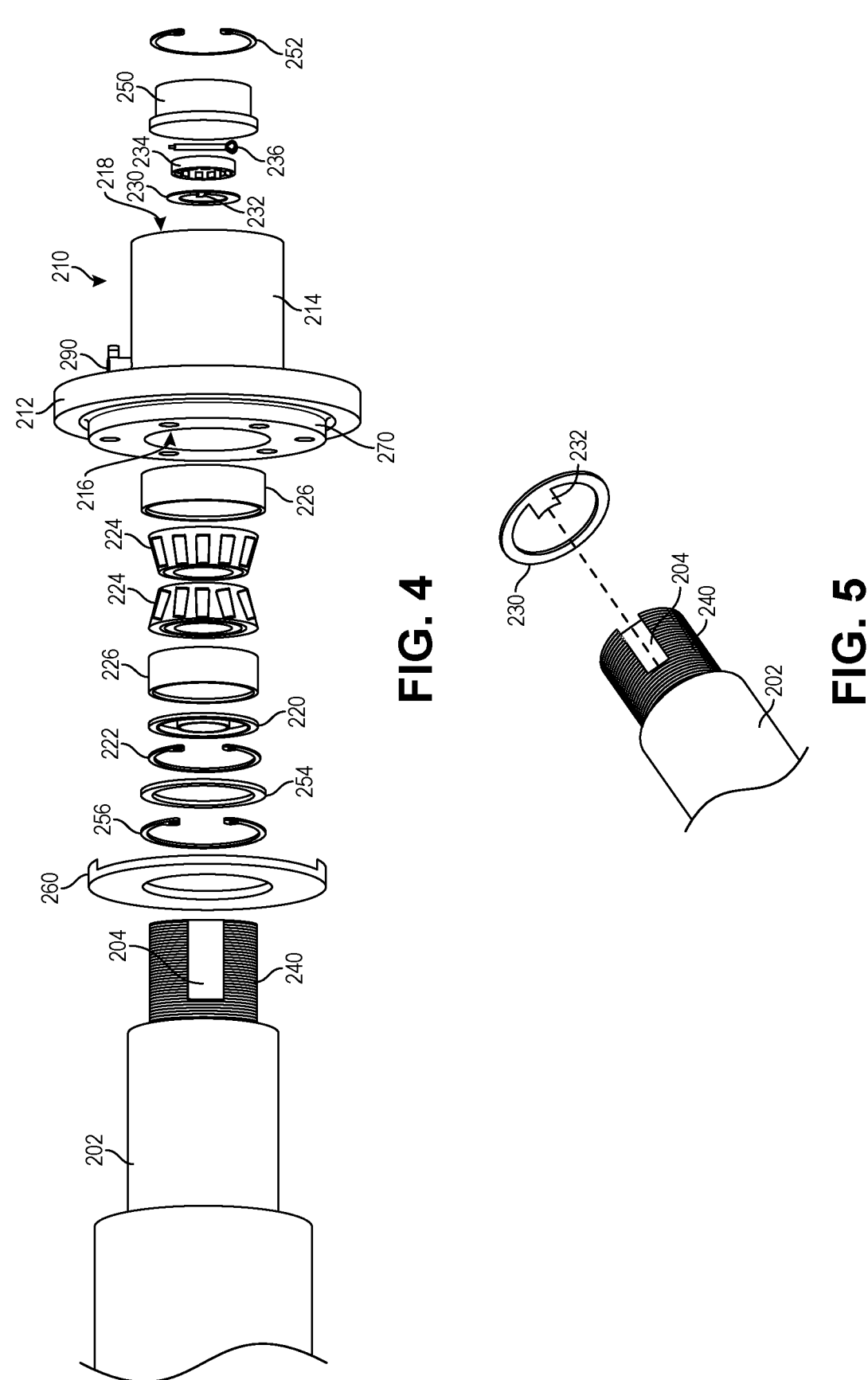
FIG. 4 is an expanded view of an axle and hub kit in accordance with some embodiments.
FIG. 5 is a side perspective view of an axle and a washer in accordance with some embodiments.

FIG. 3 is a cross-sectional view of an assembled greasable hub and axle kit 200. FIG. 4 is an expanded view of one end of a greasable hub and axle kit 200 depicting an exemplary order that various components are assembled. As best depicted in FIGS. 3 and 4, in some embodiments, greasable hub and axle kit 200 may comprise an axle 202 acting as an axle component for track 122 of machine 124 and may further act as an attachment apparatus for one or more parts or components of greasable hub and axle kit 200 and/or for one or more parts or components of track assembly 100. In some embodiments, greasable hub and axle kit 200 may be used with machines 124 of varying sizes, dimension, or configurations, and accordingly, may comprise varying dimensions, sizes, or configurations compatible with specific machines 124. For example, in some embodiments, axle 202 may generally comprise a cylindrical design, which may aid in rotating the greasable hub and axle kit 200 and/or for rotating at least one wheel of the machine 124. In some embodiments, axle 202 may comprise a uniform thickness throughout. For example, axle 202 may comprise a diameter of about 0.5 inches to about 3 inches. In further embodiments, axle 202 may comprise varying, or otherwise non-uniform thicknesses. For example, axle 202 may comprise at least one portion that is thicker than at least one other portion. By way of non-limiting example, axle 202 may comprise a central region that comprises a greater thickness than the two end portions of the axle 202, which may comprise a smaller thickness than the central region. In some embodiments, the central portion of axle 202 may comprise a diameter of about 0.5 inches to about 3 inches, and the two end portions of axle 202 may comprise a diameter of about 0.25 inches to about 2.5 inches. By way of non-limiting example, axle 202 may comprise a central portion comprising a diameter of about 1.75 inches and two end portions comprising a diameter of about 1.25 inches. In another example, axle 202 may comprise a central portion comprising a diameter of about 1.5 inches and two end portions comprising a diameter of about 1 inch. However, it will be appreciated that in some embodiments, axle 202 may comprise only one end that comprises a smaller thickness than the central region. In embodiments comprising more than one thickness regions, the location and proportions of the differing thickness regions may be dependent on factors including, but not limited to the dimensions of the frame 112, the dimensions of the hub portion of the greasable hub and axle kit 200, as described below, the size of the wheel used with the greasable hub and axle kit 200, among other factors.

In some embodiments, the length of the axle 202 may vary, and the length may be dependent on factors including but not limited to the size of the machine 124 that axle 202 is used with. For example, in a non-limiting example, the axle 202 may comprise a total length of about 6 inches to about 24 inches; the central portion that may comprise a length of about 6 inches to about 20 inches, and each of the two end portions that may comprise a length of about 2 inches to about 6 inches.

It will be appreciated that the dimensions, length, shape, and/or other structural aspects of axle 202, and the other parts or components of greasable hub and axle kit 200 may vary, depending on the embodiment. Particularly, embodiments of greasable hub and axle kit 200 may be used with many embodiments and variations of machine 124, and accordingly, greasable hub and axle kit 200 may comprise dimensions that are compatible with a variety of embodiments of machine 124. Accordingly, the lengths, dimensions, and sizes described herein are intended to be illustrative, rather than limiting.

In some embodiments, at least one end of the axle 202 may comprise a recessed groove 204 or defined channel, configured for accepting a modified washer. As described in greater detail below, the modified washer may be a washer with at least one bit, protrusion, projection, or extension member that may be slid into the recessed groove 204. In some embodiments, the recessed groove 204 may be variable in length and design. For example, in some embodiments, the recessed groove 204 may be defined as a straight-line recess, extending from the end of the axle 202 for about 0.5 inches to about 3 inches. In further embodiments, the recessed groove 204 may be defined in a non-linear configuration, including for example an "L" configuration, comprising a bend. It will be further appreciated that the depth of the recessed groove 204 may also vary, and may be dependent on factors including, but not limited to the length of the protrusion of the modified washer. As described in greater detail below, at least one end of the axle 202 may comprise threading for a screwable fastener. Accordingly, in some embodiments, the recessed groove 204 or defined channel may be at least partially located on the threading and may provide a gap or space in the threading.

In some embodiments, the greasable hub and axle kit 200 may comprise multiple parts or components which may aid in installation, preventing or limiting the chance of blow-outs, improving longevity, or any combination thereof, among other functions for greasable hub and axle kit 200. In some embodiments, one or more parts or components may be installed directly on the axle 202. In some embodiments, one or more parts may be indirectly installed to axle 202. For example, at least one end of the axle 202 may be configured for accepting a hub 210. As described in greater detail below, hub 210 may be configured for accepting one or more additional components or parts. In some embodiments, hub 210 may comprise at least a disc portion 212 and a cylindrical portion 214, extending outwardly from the disc portion. In some embodiments, disc portion 212 and cylindrical portion 214 may be constructed as separate parts that may be attached to form hub 210. In further embodiments, disc portion 212 and cylindrical portion 214 may be made from a single piece of material and accordingly, hub 210 may be a singular piece of molded or formed material. The dimensions of hub 210, including disc portion 212 and cylindrical portion 214, may vary, and may be dependent on factors including but not limited to the dimensions of axle 202, the dimensions of the frame 112 of machine 124, the dimensions of the wheel portion, among other factors, or any combination thereof. For example, disc portion 212 may comprise a diameter of about 6 inches to about 16 inches and a thickness of about 0.5 inches to about 3 inches and cylindrical portion 214 may comprise a height of about 6 inches to about 18 inches, a diameter of about 4 inches to about 10 inches, and a thickness of about 0.5 inches to about 3 inches.

In some embodiments, the disc portion 212 of hub 210 may comprise a generally circular or cylindrical design, which may be configured for accepting, bracing, or supporting a wheel of machine 124. Accordingly, the dimensions of disc portion 212 may vary and may be dependent on factors including, but not limited to the dimensions of a wheel, the dimensions of axle 202, the dimensions of cylindrical portion 214, or any combination thereof, among other factors. In some embodiments, disc portion 212 may comprise an axle opening 216, which may be an opening or void space located at the center of disc portion 212. In some embodiments axle 202 may pass through axle opening 216. Accordingly, axle opening 216 may be large enough to allow axle 202 to pass through. Disc portion 212 may further comprise one or more openings or void spaces, which may be configured for accepting a bolt or other mechanical fastener, as described in greater detail below. In some embodiments, a bolt or other mechanical fastener may enter through the void space and secure hub 210 to one or more wheels. Accordingly, in some embodiments, the openings or void spaces may be circular in design, but the openings or void spaces may be designed as any geometric shape, configured for accepting a particular type of mechanical fastener. The number of openings or void spaces may vary, as well as the positioning of the openings or void spaces. For example, in some embodiments, the disc portion 212 may comprise eight void spaces, equidistantly spaced apart around a center portion of the disc portion 212. However, it will be appreciated that other configurations and number of void spaces may be used.

In some embodiments, cylindrical portion 214 of hub 210 may extend outwardly from the disc portion 212. The length of the cylindrical portion 214 may vary and may be dependent on factors including but not limited to the dimensions of the axle 202, the dimensions of disc portion 212, the dimensions of machine 124, among other factors, or any combination thereof. In some embodiments, cylindrical portion 214 may comprise a generally cylindrical design. In further embodiments, cylindrical portion 214 may comprise other geometric shapes, and for example, may be triangular, rectangular, square, or other geometric designs and shapes. In some embodiments, cylindrical portion 214 may comprise a continuous opening, a channel, or otherwise hollow design, and an axle opening 218 at the terminal end of cylindrical portion 214. Accordingly, axle 202 may pass through the opening located within hub 210 and/or one or more parts or components may be placed within cylindrical portion 214. As described in greater detail below, hub 210 may house or store one or more parts of greasable hub and axle kit 200, which may be placed within cylindrical portion 214. In some embodiments, the channel may extend through or otherwise include disc portion 212, such that one continuous opening may be defined through cylindrical portion 214 and disc portion 212, extending from axle opening 216 to axle opening 218. In some embodiments, the openings 216, 218 defining the channel may comprise uniform-sized openings, such that the first axle opening 216 comprises the same dimensions as the second axle opening 218. In some embodiments, the openings 216, 218 defining the channel may comprise non-uniform sized openings, such that the first axle opening 216 comprises different dimensions from the second axle opening 218.

In some embodiments, a hub 210 may be positioned and placed on one of the ends of axle 202. In further embodiments, a hub 210 may be positioned and placed on each end of the axle 202. In some embodiments, prior to the placement of hub 210 on the one or more ends of axle 202, one or more additional parts or components may be placed in or on hub 210. In further embodiments, the one or more additional parts or components may be placed in or on hub 210 after the placement of hub 210 on the one or more ends of axle 202. In even further embodiments, a first set of the one or more additional parts or components may be placed in or on hub 210 prior to the placement of the hub on the one or more ends of axle 202, while a second set of the one or more additional parts or components may be placed in or on the hub after the placement of the hub 210 on the one or more ends of the axle 202.

As described above, greasable hub and axle kit 200 may comprise one or more parts or components that may be attached to, or placed inside, hub 210. For reference, in some embodiments, hub 210 may be placed on axle 202 such that disc portion 212 may be the proximate end and the cylindrical portion 214 may be the distal end. Starting at the distal end, hub 210 may comprise at least one part or component located within the dimensions of hub 210. For example, an inner seal 220 may be located at least partially within the dimensions of hub 210. In some embodiments, inner seal 220 may be located near the proximal end of hub 210. In some embodiments, inner seal 220 may be the most proximally positioned part or component within hub 210 and may be positioned in the opening defined in disc portion 212, such that inner seal 220 is flush with disc portion 212. In further embodiments, inner seal 220 may be located a distance within hub 210, such that there is a space between the opening defined in disc portion 212 and inner seal 220. Accordingly, in some embodiments, inner seal 220 may not be the most proximally positioned part or component within hub 210.

The inner seal 220 may comprise varying dimensions depending on the embodiment and dependent on factors, including but not limited to the dimensions of hub 210, disc portion 212, cylindrical portion 214, or axle 202, among other factors. For example, in some embodiments, hub 210 may comprise a generally circular geometric design and inner seal 220 may likewise comprise a circular geometric design to fit within hub 210 accordingly. The size of inner seal 220 may likewise vary and may be dependent on factors, including but not limited to the dimensions of hub 210, disc portion 212, cylindrical portion 214, or axle 202. For example, inner seal 220 may comprise a size providing for an interference fit with the inner surface of hub 210. Inner seal 220 may be manipulated into position through an acting force, such as through a hammer or other tool, or by hand. Accordingly, inner seal 220 may be manipulated into a position by a force, but in the absence of the force inner seal 220 may substantially maintain a position through an interference fit.

In some embodiments, inner seal 220 may be constructed from one material, including for example a rubber material, aluminum, steel, synthetic polymer, or other known materials. In further embodiments, inner seal 220 may be constructed from more than one material, including for example a combination of rubber, aluminum, steel, synthetic polymer, and/or other known materials. For example, in some embodiments, inner seal 220 may comprise two portions, an inner portion and an outer portion. The outer portion may surround the inner portion, and the outer portion may further be in contact with the inner surface of hub 210. The inner portion may be constructed from a rubber material and the outer portion may be constructed from steel or aluminum.

In some embodiments, inner seal 220 may be held in position through an interference fit between an outer perimeter of inner seal 220 and the inner surface of hub 210. In further embodiments, the inner surface of hub 210 may comprise a recessed groove, configured for the placement of inner seal 220 at a predetermined location for inner seal 220. Through such a design, inner seal 220 may be placed in the recessed groove and held in place through an interference fit. In even further embodiments, inner seal 220 may be held in place through one or more additional parts or components. For example, in some embodiments, inner seal 220 may be held in place by an inner seal retainer ring 222. The inner seal retainer ring 222 may comprise a snap ring or other similar locking apparatus for holding an object in place. In some embodiments, inner seal retainer ring 222 may be placed at least partially with the interior of hub 210. Inner seal retainer ring 222 may aid in retaining or maintaining the position of inner seal 220 while inside hub 210. For example, in some embodiments, inner seal retainer ring 222 may at least partially surround the exterior perimeter of inner seal 220 and engage the inner surface of the hub 210. Accordingly, in some embodiments, inner seal 220 may be held in place through a combination of an interference fit and the inner seal retainer ring 222. In further embodiments, inner seal retainer ring 222 may be positioned on either end of inner seal 220 without surrounding the inner seal 220. In some embodiments, hub 210 may comprise a recessed groove or channel configured for accepting the inner seal retainer ring 222. The recessed groove or channel may be located at a predetermined location corresponding to a predetermined final location of inner seal retainer ring 222. For example, in some embodiments, the location of the inner seal retainer ring 222 may be at about 1/16 of an inch to about 1 inch from the opening of disc portion 212. The inner seal retainer ring 222 may be placed and secured in the recessed groove, thereby preventing, or limiting movement of the inner seal retainer ring 222 and/or inner seal 220.

In some embodiments, greasable hub and axle kit 200 may comprise at least one bearing 224. Bearing 224 may be located at least partially within the interior of hub 210. In some embodiments, bearing 224 may be positioned adjacent to or next to inner seal 220 and may be located towards the distal end of hub 210, relative to inner seal 220. In some embodiments, greasable hub and axle kit 200 may comprise a single bearing 224. In further embodiments, greasable hub and axle kit 200 may comprise two or more bearings 224. For example, greasable hub and axle kit 200 may comprise two bearings 224, with the two bearings 224 placed adjacent to or next to one another.

The dimensions of bearing 224 may vary, depending on the embodiment, and may be dependent on factors including but not limited to the dimensions of axle 202, hub 210, cylindrical portion 214, inner seal 220, among other factors, or any combination thereof. For example, in some embodiments bearing 224 may comprise a generally circular design, adapted to correspond to a cylindrical portion 214 comprising a circular shape. In further embodiments, bearing 224 may comprise a generally tapered design. The size of bearing 224 may likewise vary and may be dependent on factors including, but not limited to the size of axle 202, hub 210, cylindrical portion 214, inner seal 220, among other factors, or any combination thereof. For example, bearing 224 may comprise a diameter of about 2 inches to about 4 inches. In embodiments that bearing 224 comprises a tapered design, the diameter of bearing 224 may start at about 4 inches and decrease to about 2 inches at the terminal end. However, it will be appreciated that the diameter of bearing 224 may be any predetermined size. Like the diameter, the thickness of bearing 224 may also vary, and may be dependent on the factors described herein, including but not limited to the dimensions of hub 210. By way of non-limiting example, bearing 224 may comprise a thickness of about 0.25 inches to about 1.5 inches.

Bearing 224 may be designed as any currently known, or yet to be discovered design of a bearing, such as a plain bearing, a rolling-element bearing (including ball bearing or roller bearing), or any other type of bearing. Accordingly, bearing 224 may be constructed from a variety of materials. By way of non-limiting example, bearing 224 may be constructed from steel, aluminum, plastic, rubber, three-dimensional printing material, or any other known or yet-to-be-discovered material. In some embodiments, bearing 224 may be made from a single material. In further embodiments, bearing 224 may be constructed or made from two or more materials.

Optionally or additionally, in some embodiment, greasable hub and axle kit 200 may comprise a cup 226, which may be paired with bearing 224. In some embodiments, cup 226 may surround bearing 224 and aid in operation. For example, cup 226 may aid in keeping bearing 224 aligned during operation. Additionally, cup 226 may aid in keeping the rolling elements of bearing clean, improving the effectiveness of bearing 224 and extending the lifetime of bearing 224. In embodiments of greasable hub and axle kit 200 comprising more than one bearing 224, greasable hub and axle kit 200 may likewise comprise a cup 226 corresponding to each bearing. Cup 226 may comprise dimensions, sizing, and/or configurations compatible with bearing 224. Cup 226 may provide the outer ring around which bearing 224 rides. In some embodiments, the combination of cup 226 used with bearing 224 may increase the radial and/or thrust loads capacities of the greasable hub and axle kit 200. Like bearing 224, cup 226 may be constructed from a variety of materials, including but not limited to steel, aluminum, plastic, rubber, three-dimensional printing material, or any other known or yet-to-be-discovered material. In some embodiments, and as described in greater detail below, bearing 224 and/or cup 226 may be greased or otherwise lubricated. In some embodiments, the greasing of bearing 224 and/or cup 226 may aid in reducing the friction applied to bearing 224 and/or cup 226. The reduction of friction may aid in improving the lifetime of the bearing 224 and/or cup 226. Additionally, the reduction of friction may also prevent or limit the frequency of bearing 224 and/or cup 226 from breaking during operation.

Continuing outward from bearing 224, hub 210 may optionally and/or additionally comprise a top washer 230. In some embodiments, top washer 230 may be designed as a traditional washer, comprising a ring of material with a center opening or hole. As described in greater detail below, in some embodiments, top washer 230 may comprise additional features or structures to aid in preventing or limiting blowouts of greasable hub and axle kit 200. Additionally, top washer 230 may be manufactured using a variety of materials, including but not limited to steel, aluminum, plastic, three-dimensional printed material, or a synthetic polymer material, or any combination thereof. Top washer 230 may provide advantages that are commonly associated with utilizing a washer. For example, top washer 230 may aid in reducing the friction applied to one or more of bearings 224 while bearings 224 are in movement. Through the reduction of friction on the bearings 224, the lifetime of bearings, hub 210, axle 202, greasable hub and axle kit 200, or any combination thereof may be improved. The dimensions of top washer 230 may vary, and may be dependent on factors including, but not limited to the dimensions, size, and/or configuration of bearing 224.

In existing axle and hub systems, there is a risk of potential blow-outs that may compromise the axle and hub system over extended periods of use. Particularly, through repeated rotations, there may be a risk of washers spinning out of place or otherwise coming loose. The displacement of a washer may cause other parts or components within the hub to also come loose, leading to an increased risk of a blowout or other failure. For example, as described in greater detail below, greasable hub and axle kit 200 may comprise a mechanical fastener, such as a castle nut or other similar threaded fastener, which may at least partially secure at least one of the parts or components within the hub 210. Traditional washers may spin or rotate in relation to the movement of the wheel paired with the hub 210, and such rotation can cause the castle nut, or similar nut or fastener, to rotate out of position. Accordingly, in some embodiments, top washer 230 may be configured as an "anti-spin washer", comprising a structure that aids in maintaining the position of top washer 230 after placement and/or for reducing or eliminating the chance or frequency of the top washer 230 from becoming displaced.

Accordingly, in some embodiments, top washer 230 may optionally and/or additionally comprise at least one bit 232, protrusion, or other extending member, extending from the solid portion of top washer 230 into the center opening of top washer 230. For example, in some embodiments, top washer 230 may comprise a single bit 232. In further embodiments, top washer 230 may comprise two bits 232. In even further embodiments, top washer 230 may comprise three bits 232. However, it will be appreciated that top washer 230 may comprise any number of bits 232. In embodiments comprising more than one bits 232, the bits 232 may be spaced at equidistant locations on top washer 230. In further embodiments comprising more than one bits 232, bits 232 may be spaced at any predetermined location on top washer 230, including for example, non-uniform distances.

In some embodiments, the dimensions of bit 232 may vary, and may be dependent on factors including, but not limited to the dimensions of top washer 230, bearing 224, recessed groove 204, among other factors or any combination thereof. For example, bit 232 may comprise a generally rectangular design, having a length of about 0.1 inches to about 0.25 inches and a height of about 0.05 inches to about 0.25 inches. As described above, axle 202 may comprise at least one recessed grooved 204 defined at least at one end of the axle 202. The depth of the recessed groove 204 may generally correspond to the size of bit 232, providing a channel for bit 232 to enter and for allowing top washer 230 to slide or move into position. As described above and in some embodiments, top washer 230 may comprise more than one bit 232 and accordingly, axle 202 may comprise a corresponding number of recessed grooves 204 matching the number of bits 232.

FIG. 5 is a perspective view of an exemplary embodiment that axle 202 and top washer 230 may be positioned for aligning bit 232 with the recessed groove 204 of axle 202. As depicted in FIG. 5, in some embodiments, bit 232 may be oriented or positioned to align with the recessed groove 204 located at the end of the axle 202. Accordingly, when top washer 230 is slid over the end of axle 202, bit 232 may be inserted into the recessed groove 204 and slide along recessed groove 204 as top washer 230 is placed into position. Further, in some embodiments, during rotation of axle 202 or hub 210, bit 232 may engage with the sides of recessed groove 204, thereby preventing or reducing the rotation of top washer 230. As described in greater detail below, the prevention or reduction of the rotation of top washer 230 may prevent the rotation of a fastener retaining the interior parts or components of hub 210. This may aid in preventing the unthreading or loosening of the fastener, which may lead to an eventual blowout of the hub 210.

In some embodiments, the one or more parts or components located within hub 210 may be retained within hub 210 using a fastener 234. In some embodiments, the fastener 234 may be a removable mechanical fastener, including for example a castle nut. However, it will be appreciated that other mechanical fasteners may be used, including any nut design, clamp, bolt, or other fasteners. In further embodiments, fastener 234 may be a permanent mechanical fastener, including for example a rivet. In some embodiments, fastener 234 may be used to retain the one or more parts or components located within hub 210. In some embodiments, fastener 234 may comprise more than one piece or article for securing the one or more parts or components within hub 210. For example, in some embodiments, fastener 234 may be a castle nut and the castle nut may be paired with a cotter pin 236 for securing the castle nut in place. However, in other embodiments, the cotter pin 236 may be substituted for another fastening aid, such as a bolt, rivet, or other similar device.

In some embodiments, at least one end of axle 202 may comprise a threaded end 240. In some embodiments, only one end of the axle 202 may comprise a threaded end 240. In further embodiments, each end of the axle 202 may comprise a threaded end 240. In some embodiments, fastener 234 may be a threaded fastener, such as a castle nut. Accordingly, fastener 234 may thread onto the traded end of axle 202 to placement. Additionally, threaded end 240 may vary in length, and the length of threaded end 240 may be dependent on factors, including but not limited to the size of fastener 234, the size of top washer 230, among other factors. As described above, in some embodiments, axle 202 may comprise a recessed groove or channel for embodiments of top washer 230 comprising at least one bit 232. In some embodiments, at least a portion of the recessed groove or channel for top washer 230 may be located on threaded end 240. In some embodiments, the recessed groove or channel may extend the entire length of threaded end 240. In some embodiments, the recessed groove or channel may extend the entire length of threaded end 240 and extend into the non-threaded portion of axle 202. In further embodiments, threaded end 240 may be substituted with another surface texture or structure, including for example, a starred end, squared end, or other design. Further, in some embodiments, fastener 234 may be a mechanical fastener that is compatible with the design of the end of axle 202.

In some embodiments, hub 210 may further comprise at least one outer dust cap 250. Outer dust cap 250 may be configured as an end cap or end piece to hub 210, providing a cover or barrier for preventing dust, debris, or other materials from entering the interior of hub 210. In some embodiments, outer dust cap 250 may be manufactured or constructed from rubber, aluminum, steel, plastic, three-dimensional printed material, synthetic polymer, or other materials. In some embodiments, outer dust cap 250 may be placed over the end of axle 202 and at least partially inside hub 210. Further, outer dust cap 250 may comprise dimensions that are generally compatible with the dimensions of hub 210. In some embodiments, outer dust cap 250 may be placed inside hub 210 and may be pressed against one or more of the parts or components located within hub 210. For example, out dust cap 250 may be placed inside hub 210 until pressing up against top washer 230 and/or bearing 224. Accordingly, in some embodiments, outer dust cap 250 may comprise a generally circular base or bottom, corresponding to the shape and/or size of cylindrical portion 214. In some embodiments, the circular base or bottom of outer dust cap 250 may comprise a size such that the outer edges of the base or bottom of outer dust cap 250 engages the inner surface of hub 210, but not so large as to prevent manipulating the position of outer dust cap 250. For example, in some embodiments, outer dust cap 250 may comprise a base or bottom section that limits, prevents, or reduces dirt, debris, or materials from entering the interior of hub 210. In some embodiments, outer dust cap 250 may further comprise at least a second portion. Second portion may be configured to correspond to the end of super but kit axle 202, which may allow outer dust cap 250 to be positioned and placed over a terminal end of greasable hub and axle kit 200. In some embodiments, the second portion of outer dust cap 250 may comprise a similar cylindrical design as cylindrical portion 214 of hub 210, for placement over the end of axle 202. However, it will be appreciated that the second portion of outer dust cap 250 is not limited to a cylindrical design and may comprise any shape or design. In further embodiments, outer dust cap 250 may comprise more or less than the two portions described above. For example, in some embodiments, outer dust cap 250 may comprise a single portion, such as a single cylindrical portion.

Outer dust cap 250 may be retained in position through multiple methods and depending on the embodiment. In some embodiments, outer dust cap 250 may be selectively removable from hub 210. For example, in some embodiments, outer dust cap 250 may be held in position through an interference fit between the outer perimeter of outer dust cap 250 and the inner surface of hub 210. In some embodiments, outer dust cap 250 may be held in position through a fastening aid, including for example an outer dust cap snap retainer ring 252. For example, outer dust cap retainer ring 252 may function similarly to inner seal retainer ring 222 and may provide a locking effect and keep outer dust cap 250 in position. Accordingly, in some embodiments, outer dust cap 250 may be retained in position through a combination of an interference fit and a retainer ring. In some embodiments, the interior of hub 210 may comprise a recessed groove or channel, configured for accepting outer dust cap retainer ring 252. The recessed groove or channel for accepting outer dust cap retainer ring 252 may be positioned within hub 210 at a predetermined location for outer dust cap 250. In some embodiments, outer dust cap 250 may be permanently attached or positioned in hub 210, and for example, may be welded in place or retained in place through an adhesive, by way of non-limiting example. As best depicted in FIG. 2, when outer dust cap 250 is installed, the inner components or parts located within hub 210 may be covered and may be unexposed.

In some embodiments, greasable hub and axle kit 200 may comprise additional parts or components which may aid in limiting or preventing dirt, debris, or other material from entering the interior of hub 210 or the one or more parts or components located within hub 210. In some embodiments, greasable hub and axle kit 200 may comprise at least one seal protective ring 254. Seal protective ring 254 may comprise a design generally corresponding to the design of hub 210 and/or inner seal 220. For example, seal protective ring 254 may comprise a generally circular design. In some embodiments, seal protective ring 254 may comprise an opening or void space in the center, providing for an opening or channel for axle 202. In some embodiments, seal protective ring 254 may be manufactured or constructed from a variety of materials, including for example, stainless steel, aluminum, plastic, rubber, synthetic polymer, among other materials. Like inner seal 220 as described above, seal protective ring 254 may be retained in position through a variety of methods and means. For example, in some embodiments, seal protective ring 254 may be retained in position through an interference fit between the outer boundary of seal protective ring 254 and the inner surface of hub 210. In further embodiments, the inner surface of hub 210 may comprise a recessed groove sized for seal protective ring 254 and located at the predetermined location for seal protective ring 254. However, it will be appreciated that in even further embodiments, seal protective ring 254 may be retained in place through other means, including but not limited to adhesives, mechanical fasteners, among other methods. For example, in some embodiments seal protective ring 254 may be paired with a seal protective ring snap ring 256, which may be a snap ring configured for locking seal protective ring 254 in place. In some embodiments, hub 210 may comprise a recessed groove configured or accepting seal protective ring snap ring 256, which may be located at a predetermined location corresponding to the placement of seal protective ring 254.

Seal protective ring 254 may be placed adjacent to, or next to, inner seal 220 and/or inner seal retainer ring 222. In some embodiments, seal protective ring 254 may be placed against inner seal 220 and/or inner seal retainer ring 222 such that at least a portion of seal protective ring 254 is pressed against and touching inner seal 220 and/or inner seal retainer ring 222. Accordingly, at least a portion of seal protective ring 254 may be located within the interior of hub 210. In some embodiments, the entirety of seal protective ring 254 may be located within the interior of hub 210. For example, in some embodiments, seal protective ring 254 may be positioned within hub 210, such that seal protective ring 254 may be flush with the bottom portion of hub 210.

In some embodiments, one or more parts or components of greasable hub and axle kit 200 may be located at least partially external to hub 210. For example, in some embodiments greasable hub and axle kit 200 may comprise an outer seal protection cap 260, which may be located on an external portion of hub 210. In some embodiments, outer seal protection cap 260 may act as a barrier or cover to inner seal 220 and/or hub 210 and may prevent or reduce dust, dirt, debris, or other materials from entering the interior of hub 210 or from engaging seal 220. In some embodiments, outer seal protection cap 260 may be manufactured or constructed from a variety of materials, including but not limited to steel, aluminum, plastic, rubber, three-dimensional printed material, synthetic polymer, among other materials. The dimensions of outer seal protection cap 260 may vary and may be dependent on factors including but not limited to the shape and dimensions of hub 210, disc portion 212, among other factors. For example, in some embodiments, outer seal protection cap 260 may comprise a generally circular design corresponding to the general circular design of disc portion 212. However, it will be appreciated that in further embodiments, outer seal protection cap 260 may comprise a differing geometric shape from disc portion 212. In some embodiments, outer seal protection cap 260 may comprise an opening or void space, generally corresponding to the opening or void space defined in hub 210, providing for a channel or pathway for at least a portion of axle 202.

In some embodiments, hub 210 may comprise a base extending portion 270, which may be located adjacent to disc portion 212 and opposite from cylindrical portion 214. In some embodiments, base extending portion 270 may be generally cylindrical in shape, like the design of cylindrical portion 214. In further embodiments, base extending portion 270 may comprise any geometric shape. In some embodiments, the shape of base extending portion 270 may generally correspond to the shape of outer seal protection cap 260. For example, base extending portion 270 may comprise a generally circular design, corresponding to a circular design outer seal protection cap 260. However, it will be appreciated that base extending portion 270 may comprise any geometric shape, and in some embodiments may comprise a shape that is different from inner seal protection cap. The dimensions of base extending portion 270 may vary, depending on the embodiment, and for example, may be about 0.5 inches to about 1.5 inches in length.

In some embodiments, the size of outer seal protection cap 260 may vary. For example, in some embodiments, outer seal protection cap 260 may be smaller in size than disc portion 212 and/or base extending portion 270, such that the entirety of outer seal protection cap 260 is located within the boundary of disc portion 212 and/or base extending portion 270. In further embodiments, outer seal protection cap 260 may comprise generally the same size as disc portion 212 and/or base extending portion 270, such that the outer boundary of outer seal protection cap 260 may be flush with the outer boundary of disc portion 212 and/or base extending portion 270. In even further embodiments, outer seal protection cap 260 may be larger in size than disc portion 212 and/or base extending portion 270, such that a portion of outer seal protection cap 260 may extend beyond the boundary of disc portion 212 and/or base extending portion 270. For example, outer seal protection cap 260 may comprise a size and design larger than disc portion 212 and/or base extending portion 270 and comprise a lip portion, such that a portion of outer seal protection cap 260 may extend past and wrap around the boundary of dis portion 212 and or base extending portion 270.

In some embodiments, outer seal protection cap 260 may be attached and secured to hub 210 through multiple methods and means. For example, outer seal protection cap 260 may be retained in position through an interference fit between outer seal protection cap 260 and base extending portion. In some embodiments, outer seal protection cap 260 may be permanently attached and secured using an adhesive, mechanical fastener, welding, or other permanent methods of attachment. For example, in some embodiments, at least one bolt, rivet, or other permanent fastener 262 may be inserted through outer seal protection cap 260 and into hub 210. In some embodiments, outer seal protection cap 260 may be held in place by three fasteners 262, by way of a non-limiting example. In further embodiments, inner seal protection cap 260 may be removably attached and secured through a removable mechanical fastener, such as a screw.

In some embodiments, the hub 210 may optionally or additionally comprise at least grease zerk 290 coupled to a portion of hub 210. In some embodiments, grease zerk 290 may be located on the cylindrical portion 214 of hub 210. In further embodiments, grease zerk 290 may be located on the disc portion 212 of hub 210. The grease zerk 290 may be used to provide grease or other lubricant to greasable hub and axle kit 200, which may aid in performance of greasable hub and axle kit 200 and/or for improving the lifetime of greasable hub and axle kit 200. For example, through grease zerk 290, grease may be applied to greasable hub and axle kit 200 during installation. In further embodiments, through grease zerk 290, grease may be periodically applied to greasable hub and axle kit 200 during the lifetime that greasable hub and axle kit 200 is attached to machine 124.

Figure 6:
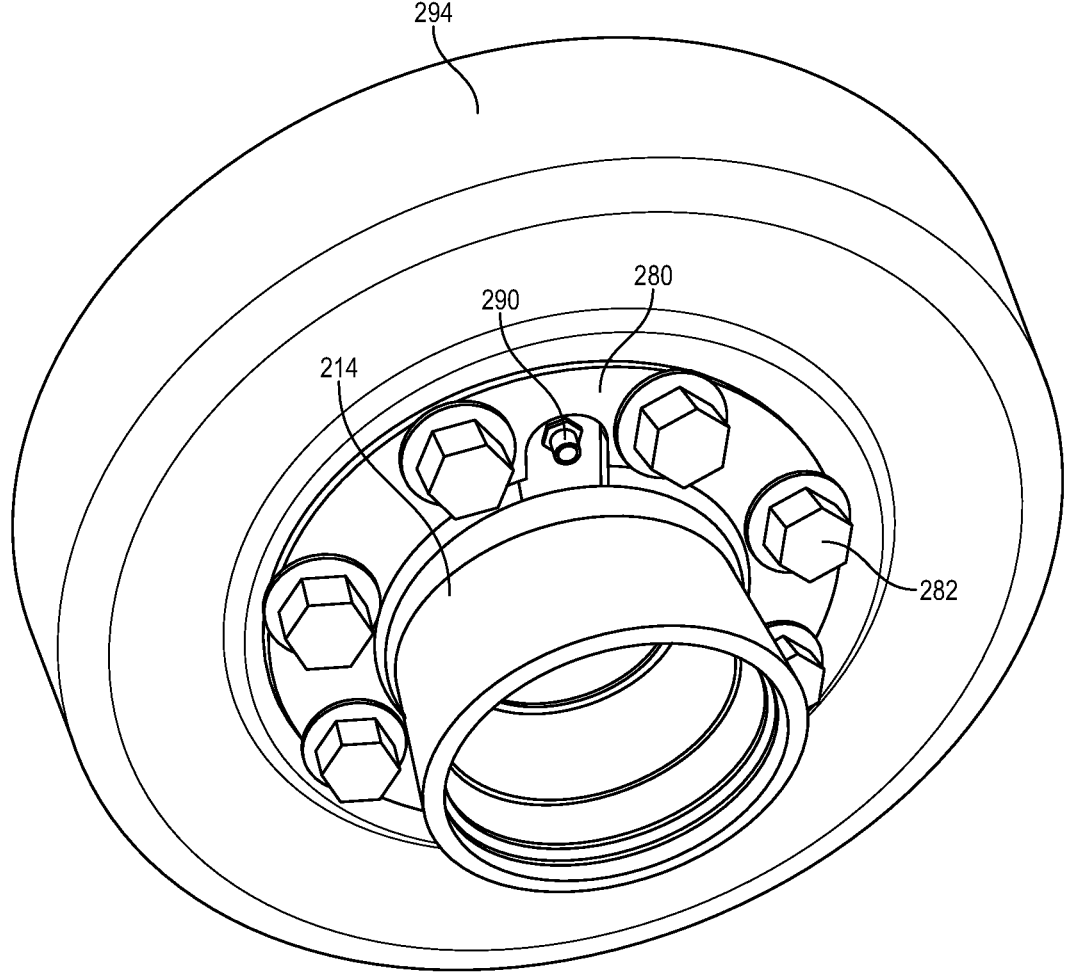
FIG. 6 is a side perspective view of an assembled hub, pilot flange, and wheel in accordance with some embodiments.

FIG. 6 is a perspective view of an exemplary embodiment of greasable hub and axle kit 200 with an attached pilot flange 280. As best depicted in FIG. 6, in some embodiments, greasable hub and axle kit 200 may optionally and/or additionally comprise at least one pilot flange 280, which may aid in the installation of a wheel 294 on the greasable hub and axle kit 200 and/or for allowing a greater variety of wheels to be attached to greasable hub and axle kit 200. The embodiment as illustrated in FIG. 6 depicts a hub 210 that is partially unassembled for illustrative purposes, and in some embodiments, pilot flange 280 may be attached to greasable hub and axle kit 200 after hub 210 has been fully assembled.

In some embodiments, wheel 294 may be manufactured from a variety of manufacturers and from a variety of different materials, such as rubber, steel, or alloy. In some cases, there may be minor variations between various wheels 294 that may be used with greasable hub and axle kit 200. Accordingly, a pilot flange 280 may be used in connection with greasable hub and axle kit 200 to aid in providing a more consistent fit between the various wheels 294 and greasable hub and axle kit 200. For example, pilot flange 280 may aid in reducing any looseness or play between the wheel 294 and greasable hub and axle kit 200. In some embodiments, pilot flange 280 may aid in securing wheels that may be too large to normally fit on greasable hub and axle kit 200. For example, for a wheel having a larger diameter than the diameter of greasable hub and axle kit 200, a pilot flange 280 may be placed inside the wheel, and the wheel and pilot flange may be secured to greasable hub and axle kit 200.

Pilot flange 280 may comprise various dimensions and may be made from various materials. For example, pilot flange 280 may comprise a generally circular design, comprising a center opening generally corresponding to the cylindrical portion 214 of hub 210. Pilot flange 280 may comprise an overall diameter of about 4 inches to about 14 inches. However, it will be appreciated that pilot flange 280 may comprise dimensions that are larger or smaller, and the size of pilot flange 280 may be dependent at least in part on the size of the attached wheel. Further, in some embodiments, pilot flange 280 may be manufactured or constructed from steel, aluminum, rubber, alloy, synthetic polymer, among other materials.

In some embodiments, pilot flange 280 may comprise one or more openings or void spaces that may provide a pathway or channel for one or more mechanical fasteners 282, such as a bolt, rivet, screw, or other mechanical fastener. The openings or void spaces may be placed equidistantly apart and may generally surround the center opening of pilot flange 280. For example, in some embodiments, pilot flange 280 may comprise eight equidistantly spaced openings or void spaces around the center opening of pilot flange 280. Accordingly, in some embodiments pilot flange 280 may be secured using eight mechanical fasteners 282. However, it will be appreciated that the number of openings and/or mechanical fasteners 282 may vary. After installation of greasable hub and axle kit 200 in frame 112, as described in greater detail below, a wheel 294 may be placed on greasable hub and axle kit 200 by sliding the wheel 294 over cylindrical portion 214 and pressing the wheel against disc portion. Pilot flange 280 may then be placed in position, by sliding pilot flange over cylindrical portion 214 and pressing pilot flange against disc portion. Then, one or more mechanical fasteners may be used to attach both pilot flange and wheel to greasable hub and axle kit.

Figure 7:
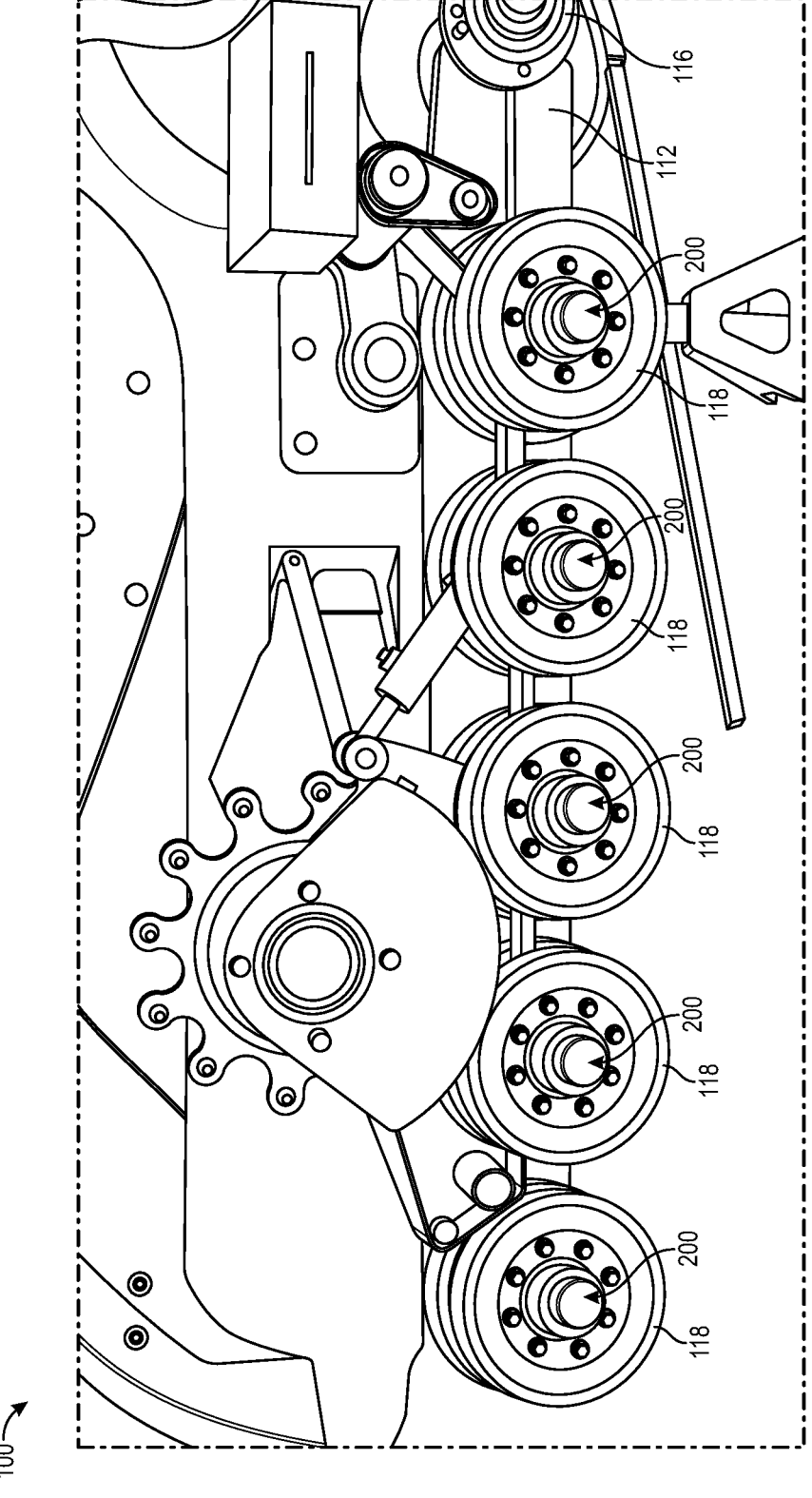
FIG. 7 is a side perspective view of an assembled axle and hub kit attached to a track assembly in accordance with some embodiments.

In some embodiments, greasable hub and axle kit 200 may be installed through a multi-step process of installation. FIG. 7 depicts an exemplary embodiment of an installed greasable hub and axle kit 200 in the frame 112 of a machine 124. For illustrative purposes, FIG. 7 depicts a frame 112 that has been removed from machine 124. Accordingly, in some embodiments, greasable hub and axle kit 200 may be installed in frame 112 when frame 112 has been removed from machine 124. However, it will be appreciated that in some embodiments, greasable hub and axle kit 200 may be installed in frame 112 when frame 112 is still attached or connected to machine 124. For example, in a first installation method, greasable hub and axle kit 200 may be required to be welded into the frame of a continuous track machine. In some embodiments, greasable hub and axle kit 200 may replace the factory axle of a continuous track machine providing an axle with increased strength and/or longevity over the factory axle. Accordingly, in some embodiments, a first step of installing greasable hub and axle kit 200 may include the removal of a factory axle, pre-existing, or other axle already installed in the frame of the continuous track machine. In some embodiments, the pre-existing axle may be removed from the frame using any known methods of removal, such as through saws or other cutting tools, cutting torch or other heated methods, or other known methods of removal. For example, the pre-existing axle may be removed using a cutting saw. In some embodiments, the axle 202 of greasable hub and axle kit 200 may be larger than the pre-existing axle, and a larger hole may be required to be made in frame 112. In some embodiments, at least a portion of the pre-existing axle may remain uncut or unremoved and attached to the mainframe. For example, a stub of about 0.75 inches may remain attached to the frame 112. In some embodiments, the remaining stub of the pre-existing axle may be used as a guide for installing the greasable hub and axle kit 200. The process of removing the pre-existing axle may be repeated on both sides of the frame 112, and a corresponding stub may be present on each side of the frame 112. Additionally, and/or optionally, excess material may be removed from one of, or each of, the remaining stubs. For example, an electric grinder may be used to remove any excess material from the stubs, such that a bore guide or other component of the greasable hub and axle kit 200 may slide more freely on the stub. In some embodiments, frame 112 may be a newly manufactured frame without any pre-existing axles. In this scenario, the above-described steps may not occur.

In some embodiments, following the removal of the of the pre-existing axle from the frame 112, a bore guide may be used to begin a boring process of creating a larger hole for axle 202. For example, the bore guide may have substantially the same dimensions of axle 202. In some embodiments, the boring process may be delayed until after one, or each, of the stubs have cooled from the cutting process. During the boring process, an oil bath may be used to keep the operating surface of the frame 112 slick and cool to prevent damage. The oil bath used may be any known oil or lubricant that may be used in boring processes. Further, in some embodiments, a whole saw and arbor attachment may be used with the boring device to achieve a proper depth of penetration into the frame 112 over the stub. Using the bore guide, a boring device may cut through frame 112 to create a hole or opening that is sized for axle 202. Once the boring process on the first side of frame 112 is completed, the boring process may be repeated on the opposite side of frame 112. In some embodiments, upon completion of the boring process, mud, shavings, oil, or other debris may be removed from the boreholes. The removal of such debris may aid in the installation of axle 202, providing a clean surface area for installation.

In some embodiments, following completion of the boring process, the greasable hub and axle kit 200 may be ready for installation. In some embodiments, including the embodiments described above, axle 202 may comprise one or more alignment grooves, located at one or more ends of axle 202. The one or more grooves may aid in alignment of axle 202 during installation. For example, axle 202 may be inserted into one of the pre-made boreholes created during the boring process. In some embodiments, the one or more grooves may provide an indication as to whether the axle 202 has been installed correctly. For example, when the axle 202 is installed correctly inside of the frame 112, the axle 202 may be positioned in such a way that the grooves will be flush, or nearly flush with the boring hole. In some embodiments, the grooves may also provide an indication if the axle 202 is out of position or has not been installed correctly.

In some embodiments, following placement of axle 202 in the borehole, the axle 202 may be welded onto the frame 112, providing for a secure placement of the axle 202. In some embodiments, the welding process may comprise a single layer of welding or alternatively, may comprise multiple welding layers. For example, in some embodiments, axle 202 may be tack welded in place, providing a temporary holding of axle 202 until final assembly of greasable hub and axle kit 200, at which time additional welding may occur.

In some embodiments, an optional step to protect grease zerk 290 may be implemented. For example, in some embodiments, grease zerk protectors 296 may be temporarily installed to protect grease zerk 290 during installation of greasable hub and axle kit 200. In some embodiments, two threaded screws may be inserted into the two openings or void spaces of disc portion 212 that are adjacent to grease zerk 290. The two threaded screws may be long enough in length to extend past grease zerk 290, thereby providing a degree of protection to grease zerk 290 from accidental bumping or contact. The threaded screws may remain in place until a wheel is ready to be bolted or attached to greasable hub and axle kit 200.

In some embodiments, following the tack welding of the axle 202, one or more bearings 224 may be placed in the opening of hub 210. In some embodiments, one bearing may be placed in the bore of a hub 210. In some embodiments, the bearing 224 be packed with grease or another lubricant prior to insertion into hub 210. For example, prior to insertion of the bearing 224 into the bore of the axle 202, grease or other lubricant may be applied to the bearing by hand or by a pack loader. Grease may be continually applied until grease begins to leak or spill out from between the inner and outer frame of the bearing 224. Grease may also be applied to the exterior of the bearing 224. In some embodiments, the application of grease in both the interior and exterior portions of the bearing 224, may reduce the amount of friction applied to the bearing 224 during operation. Following the greasing of the bearing 224, the greased bearing 224 may be inserted into and packed into the interior of hub 210. In some embodiments, a second bearing 224 may be greased and placed into the interior of hub 210 and may be placed adjacent to the first bearing 224.

In some embodiments, the inner seal 220 may be inserted and placed in the interior of hub 210. In some embodiments, grease may be applied to the outer perimeter of inner seal 220. The seal may be driven into the hub 210 until reaching a recessed groove and may be positioned just below the groove. For example, the inner seal 220 may be driven into the axle 202 until reaching about $\frac{1}{16}$ of an inch below the retainer ring groove. Following placement of the inner seal 220, the seal retainer ring 222 may be placed in hub 210 by inserting the seal retainer ring 222 into the retainer ring groove, thereby securing the seal retainer ring 222, and inner seal 220, in place. Upon placement of the inner seal 220 and the seal retainer ring 222, grease or other lubricant may be applied to the inner seal 220. Following the placement of the inner seal 220 and seal retainer ring 222 in the hub 210, the seal protective ring 254 may be placed in hub 210, which may be placed adjacent or next to inner seal 220. In some embodiments, seal protective ring 254 may be retained in place through the placement of seal protective ring snap ring 256.

In some embodiments, prior to the installation of the hub 210 onto the axle 202, the outer seal protector cap 260 may be placed and secured to the hub. For example, the outer seal protector cap 260 may be placed over base extending portion 270 of hub 210 and secured. The outer seal protector cap 260 may be secured to the hub 210 using at least one mechanical fastener, such as a bolt, however, other fastening methods may be used. In some embodiments, an anti-seize material may be applied to the mechanical fasteners, aiding in the removal of the fasteners in case the outer seal protector cap 260 may need to be removed from the hub 210. The hub 210 may then be positioned onto the axle 202 and pressed into place until the hub 210 is securely positioned. Following the placement of the hub 210 on axle 202, a second bearing 224 may be inserted into the hub 210 and pressed until reaching the first bearing 224. In some embodiments, the top washer 230 may be installed for placement against at least one of the bearings 224. In some embodiments, the top washer 230 may be an anti-spin washer as described above and may be installed by aligning bit 232 with recessed groove 204 at the end of axle 202. Following the placement of the interior parts or components, fastener 234 may be placed and secured to the end of axle 202. For example, fastener 234 may be a castle nut and may be threaded onto the end of axle 202. In some embodiments, fastener 234 may be tightened to about fifty lb.-ft. In some embodiments, fastener 234 may be aided through a fastening aid, including for example cotter pin 236. For example, a cotter pin may be inserted into the nearest hole in the axle shaft and bent in place, thereby locking fastener 234 in place.

In some embodiments, after fastener 234 has been secured, outer dust cap 250 and outer dust cap retainer ring 252 may be installed on hub 210, providing for additional protection to the interior of hub 210. In some embodiments, following the installation of a first hub 210 on a first side of axle 202, the steps and processes described herein, may be repeated for the other side of axle 202 with a second hub 210.

Following the installation of greasable hub and axle kit 200 to the frame 112 of machine 124 one or more wheels may be installed. The wheels may be any of the wheels described above with respect to FIGS. 1A and 1B. In some embodiments, one wheel may be attached and secured to each hub 210. Accordingly, in some embodiments, for each greasable hub and axle kit 200, two wheels may be attached. In some embodiments, a wheel may be placed over hub 210, passing along cylindrical portion 214 until reaching disc portion 212. In some embodiments, the wheel may comprise a cut-out or portion allowing the wheel to pass over grease zerk 290 to prevent contact of the wheel with grease zerk 290. Upon reaching disc portion 212, one or more fasteners may be used to secure the wheel to hub 210. For example, the one or more fasteners may be a bolt and nut. In some embodiments, the one or more fasteners may be driven through the wheel and enter disc portion 212. In some embodiments, the wheel may comprise one or more openings or void spaces, which may correspond to the openings or void spaces of disc portion 212, providing for a continuous opening through wheel and disc portion 212. Accordingly, the fastener may pass through the openings and secure wheel to disc portion 212.

In some embodiments, certain treaded machines may not require welding to install the greasable hub and axle kit 200. For example, recent developments in continuous track machines have resulted in the emergence of floating axles, whereby axles may be inserted into axle sleeves, eliminating the need to weld the axles in position. Accordingly, some embodiments of the present teachings may be used in such floating systems, wherein embodiments of greasable hub and axle kit 200 may be installed without welding greasable hub and axle kit 200 to the frame 112 of machine 124. In some embodiments, at least a portion of the steps and processes of the above-described steps may be the same when installing greasable hub and axle kit 200 in a floating system as when greasable hub and axle kit 200 is welded during installation. In some embodiments, at least a portion of the steps and processes of the above-described steps may be different when installing embodiments greasable hub and axle kit 200 in a floating system as when installing embodiments of greasable hub and axle kit 200 in a welded system.

In some embodiments, the parts and components of the greasable hub and axle kit 200 may be laid out in the order of installation, providing for a reference and confirmation that all parts are present and accounted for. Upon a review and accounting for the parts for installation, the process of installing the greasable hub and axle kit 200 in the frame 112 of the machine 124 may begin. In some embodiments, if there is a factory axle or other pre-existing axle already present in the frame 112, the pre-existing axle may be removed from the frame 112. If there is no factory axle or otherwise pre-existing axle in the frame, this step may be disregarded and the below described steps may proceed.

In some embodiments, a first bearing 224 may be greased or lubricated prior to installation into hub 210. As described above, the first bearing 224 may be greased using a bearing packer or by hand packing. In some embodiments, a second bearing 224 may also be greased following completion of greasing the first bearing 224. Following the completion of the greasing of at least the first bearing 224, the now greased first bearing 224 may be placed in the interior of hub 210 through the opening corresponding to disc portion 214.

Following placement of the first greased bearing 224, inner seal 220 may also be greased and installed into the hub 210. In some embodiments, following placement of inner seal 220, inner seal retainer ring 222 may be positioned within hub 210 for securing inner seal 220. In some embodiments, the seal protective ring 254 may also be placed and positioned next to inner seal 220. In some embodiments, following the placement of seal protective ring 254, the seal protective ring snap ring 256 may be placed for securing seal protective ring 254. In some embodiments, the above-described steps of this paragraph may be repeated for the second hub 210.

In some embodiments, one end of axle 202 may be inserted or placed into one end of one of the hubs 210 comprising the parts and components described in the previous paragraph. For example, one end of axle 202 may be inserted into the end of hub 210 corresponding to disc portion 212. Following insertion of the axle 202 into hub 210, the axle 202 may be positioned such that hub 210 is at an elevated angle. The second greased bearing 224 may be placed into the opening of hub 210 corresponding to cylindrical portion 214 and may be inserted into hub 210 until adjacent and placed next to the first bearing 224 already placed within hub 210. Next, a top washer 230 may be placed inside hub 210. In some embodiments, top washer 230 may be an anti-spin washer as defined above comprising at least one bit 232. Accordingly, in some embodiments top washer 230 may be installed by aligning bit 232 with a recessed groove 204 located at the end of axle 202. Following installation of top washer 230, fastener 234 may be installed. For example, in some embodiments fastener 234 may be a castle nut and axle 202 may comprise a threaded end. The castle nut may be turned or tightened until the castle nut bottoms out. In some embodiments, when fastener 234 is in position, the fastener 234 may be torqued to about ten to fifteen lb.-ft. After torquing the fastener 234 to about ten-fifteen lb.-ft, the fastener 234 may be loosened and reset to about zero lb.-ft. In some embodiments, and as described above, fastener 234 may utilize an additional fastening aid, such as a cotter pin, for securing fastener 234 in place. For example, a cotter pin 236 may be inserted into the nearest hole in the axle shaft and bent in place, thereby locking fastener 234 in place. In some embodiments, the outer dust cap 250 may be installed and placed at the end of hub 210 and held in place through outer dust cap retainer ring 252.

Upon completed assembly of the first hub 210 with the interior components, a shim washer may be slid over the axle 202 until reaching the end of hub 210 corresponding to disc portion 212. The axle 202, with a first attached hub 210 may then be slid into the frame 112 of the machine 124. On the side of the axle 202 opposite from the completed and installed hub, a second shim washer may be slid over the axle 202. In some embodiments, after axle 202 has been placed and positioned in the frame 112 of the machine 124, the above-described steps may be repeated with respect to installing the second bearing 224, the top washer 230, fastener 234, and fastening aid. Additionally, an outer dust cap 250 may also be placed on the second hub 210.

Many different arrangements of the various components depicted, as well as components not shown, are possible without departing from the scope of the claims below. Embodiments have been described with the intent to be illustrative rather than restrictive. Alternative embodiments will become apparent to readers of this disclosure after and because of reading it. Alternative means of implementing the aforementioned can be completed without departing from the scope of the claims below. Certain features and sub combinations are of utility and may be employed without reference to other features and sub-combinations and are contemplated within the scope of the claims. Although various embodiments have been described with reference to the embodiments illustrated in the attached drawing figures, it is noted that equivalents may be employed, and substitutions made herein without departing from the scope of the recited claims.

Although the invention has been described with reference to the embodiments illustrated in the attached drawing figures, it is noted that equivalents may be employed, and substitutions made herein without departing from the scope of the invention as recited in the claims.

Having thus described various embodiments of the invention, what is claimed as new and desired to be protected by Letters Patent includes the following:

1. An axle and hub device for a continuous track machine, the axle and hub device comprising:
    an axle having a first end and a second end, wherein each of the first end and the second end is threaded,
    wherein the axle is configured for placement in a frame of the continuous track machine;
    a first hub configured for placement on the first end of the axle;
    a second hub configured for placement on the second end of the axle;
    wherein interior to each, the first hub and the second hub includes: an inner seal, at least one bearing, an anti-spin washer, a fastener, an inner seal protector, a base extending portion extending from a disc portion longitudinally relative to the axle, and a grease zerk,
    a first outer seal protection cap fixedly coupled to the base extending portion of the first hub and extending radially outward from the axle;
    a second outer seal protection cap fixedly coupled to the base extending portion of the second hub and extending radially outward from the axle;
    a first outer dust cap covering the first end and at least partially disposed in the first hub;
    a first retainer ring positioned between a first exterior surface of the first outer dust cap and a first interior surface of the first hub to secure the first outer dust cap within the first hub;
    a second outer dust cap covering the second end and at least partially disposed in the second hub; and
    a second retainer ring positioned between a second exterior surface of the second outer dust cap and a second interior surface of the second hub to secure the second outer dust cap within the second hub.

2. The axle and hub device of claim 1, wherein the first end of the axle further includes a first recessed groove, and wherein the second end of the axle further includes a second recessed groove.

3. The axle and hub device of claim 2, wherein each of the anti-spin washers further includes at least one bit extending towards a center of the anti-spin washer.

4. The axle and hub device of claim 3, wherein the anti-spin washer of the first hub is installed by aligning the at least one bit with the first recessed groove of the first end of the axle and sliding the anti-spin washer along the first recessed groove.

5. The axle and hub device of claim 4, wherein the anti-spin washer of the second hub is installed by aligning the at least one bit with the second recessed groove of the second end of the axle and sliding the anti-spin washer along the second recessed groove.

6. The axle and hub device of claim 5, wherein each of the anti-spin washers are configured for maintaining a washer position of the anti-spin washer relative to the axle during rotation of the first hub and the second hub.

7. A continuous track system for a machine, the continuous track system comprising:
    an axle having a first end and a second end,
    wherein the axle is configured for placement in a frame of the machine;
    a first hub configured for placement on the first end of the axle;
    a second hub configured for placement on the second end of the axle,
    wherein, interior to each of the first hub and the second hub; an inner seal, at least one bearing, an anti-spin washer, a fastener, a base extending portion extending from a disc portion longitudinally relative to the axle, and an inner seal protector,
    a first outer seal protection cap fixedly coupled to the base extending portion of the first hub and extending radially outward from the axle, and
    a second outer seal protection cap fixedly coupled to the base extending portion of the second hub and extending radially outward from the axle;
    a first outer dust cap covering the first end and at least partially disposed in the first hub;
    a first retainer ring positioned between a first exterior surface of the first outer dust cap and a first interior surface of the first hub to secure the first outer dust cap within the first hub;
    a second outer dust cap covering the second end and at least partially disposed in the second hub;
    a second retainer ring positioned between a second exterior surface of the second outer dust cap and a second interior surface of the second hub to secure the second outer dust cap within the second hub;
    a first wheel, wherein the first wheel is attached to the first hub; and
    a second wheel, wherein the second wheel is attached to the second hub,
    wherein each of the first wheel and the second wheel engage a continuous track of the machine.

8. The continuous track system of claim 7, wherein each of the first hub and the second hub further comprise an inner seal retainer ring, wherein the inner seal retainer ring is configured for maintaining a position of the inner seal.

9. The continuous track system of claim 7,
    wherein the first retainer ring is configured to maintain a first position in a first recessed groove or a first channel,
    wherein the second retainer ring is configured to maintain a second position in a second recessed groove or a second channel.

10. The continuous track system of claim 7, wherein each of the first hub and the second hub further comprise a grease zerk.

11. The continuous track system of claim 7, wherein the fastener of the first hub and the fastener of the second hub is a castle nut.

12. The continuous track system of claim 11, wherein each of the first hub and the second hub further comprise a cotter pin, wherein the cotter pin engages with the castle nut for maintaining a position of the castle nut.

13. The continuous track system of claim 7, wherein each of the first hub and the second hub further comprise a pilot flange.

14. A method of installing an axle and hub to a continuous track machine, the method comprising:

inserting the axle into a frame of a machine, wherein the machine comprises a continuous track;

inserting a first bearing, a second bearing, an inner seal, and an inner seal protector into an interior of the hub, wherein the hub comprises a proximal end, a distal end, and an axle channel;

fixedly coupling an outer seal protection cap to the proximal end of the hub at a base extending portion, wherein the outer seal protection cap extends radially outward from the axle;

placing the proximal end first, onto an end of the axle, wherein the axle passes through the axle channel;

inserting through an opening of the distal end of the hub, a top washer, and a fastener into the interior of the hub;

securing the fastener to the end of the axle;

placing and securing an outer dust cap inside the hub, wherein the outer dust cap covers the opening of the distal end of the hub and at least a portion of the outer dust cap is disposed in the interior of the hub; and placing a retainer ring between an exterior of the outer dust cap and the interior of the hub between the outer dust cap and the hub in a groove or channel of the hub to secure the outer dust cap to the hub.

15. The method of claim 14, further comprising, applying grease to the first bearing and the second bearing prior to insertion into the hub.

16. The method of claim 15 further comprising, applying the grease to the inner seal prior to insertion of the inner seal into the hub.

17. The method of claim 16 further comprising, applying the grease to the interior of the hub via a grease zerk, wherein the grease zerk is coupled to the hub.

18. The method of claim 15, wherein the end of the axle further includes at least one recessed groove, wherein the top washer includes at least one bit extending towards a center of the top washer.

19. The method of claim 18, wherein the top washer installed by aligning the at least one bit with the at least one recessed groove of the end of the axle and sliding the top washer along the at least one recessed groove.

20. The axle and hub of claim 1, wherein the first outer seal protection cap is fixedly coupled to the first hub by a mechanical fastener extending through the first outer seal protection cap into the first hub and the first hub and the first outer seal protection cap are in direct contact.

\* \* \* \* \*